Jan. 2, 1940.  S. Q. BATES  2,185,177

FEED WATER HEATER

Filed Nov. 23, 1936

Inventor
S. Q. Bates

By Jesse R. Stone
Lister B Clark
Attorneys

Patented Jan. 2, 1940

2,185,177

UNITED STATES PATENT OFFICE 2,185,177

FEED WATER HEATER

Sidney Q. Bates, Houston, Tex., assignor of one-half to F. H. Thrailkill, Houston, Tex.

Application November 23, 1936, Serial No. 112,347

6 Claims. (Cl. 261—112)

An object of this invention is to provide a feed water heater in combination with means for treating the water.

A further object of the invention is to provide a heater whose efficiency is not impaired by formation of scale inside of pipes and heater coils such as are in general use in the oil fields today for heating boiler feed water. I desire to eliminate the cost of replacing these coils and pipes, thus eliminating also the cost of much pipe and many fittings. I aim to provide a heater which has less initial cost and less water contamination from an open pit.

It is a further object of the invention to provide a heater where the fresh water is subjected most effectively to the action of steam and in which the heated water is maintained in continual contact with the waste steam while it is stored for use.

I also have as an object to be able to draw off the impurities settling out of the water without interfering with the use of water in the tank.

With reference to the drawing herewith, Fig. 1 is a central longitudinal section through one of my heating units.

Figures 1, 2, 3:
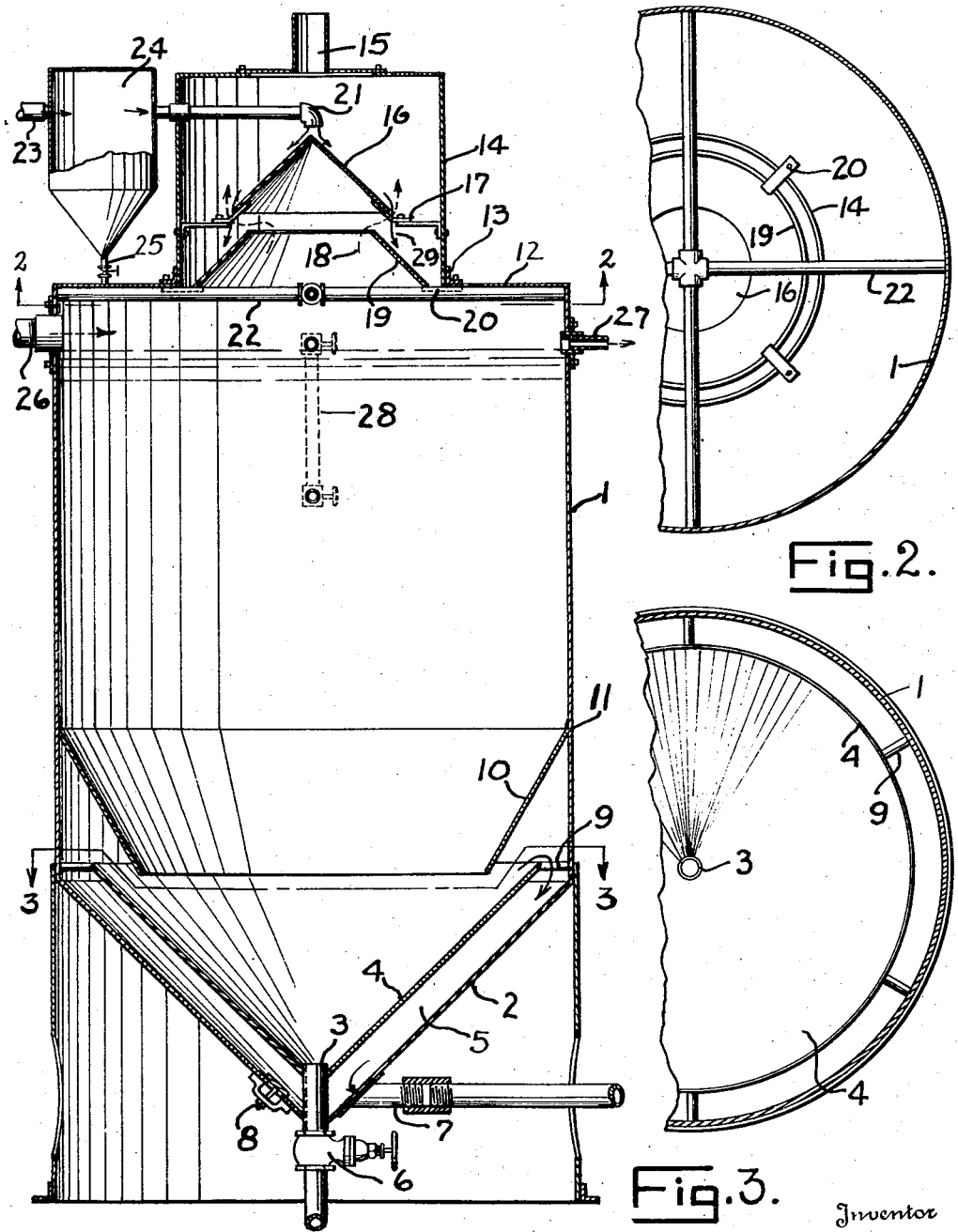
Fig. 2 is a broken transverse section on the plane 2—2 of Fig. 1.
Fig. 3 is a similar broken section on the plane 3—3 of Fig. 1.

The feed water heater which forms the subject matter of my invention consists primarily of a tank or container 1, which I have shown as made up of sheet metal and approximately cylindrical in shape and adapted to set upright on a support. This container has a bottom 2 in the shape of an inverted cone. The lower apex of the cone is formed to receive a pipe 3 which projects upwardly therethrough and into a conical baffle member 4, which is spaced from the bottom member 2 so as to provide an annular space or chamber 5. It will be seen that the chamber 5 is not connected in any way with the pipe 3, which forms an outlet through the bottom and has therein a hand-operated valve 6. Outlet from the chamber 5 and below the baffle 4 is allowed through a pipe 7 connected with said chamber and through this pipe the feed water is drawn from the tank when needed. I also provide in the bottom 2 a manhole 8, through which access may be had for purposes of cleaning and otherwise.

The baffle 4 is spaced at its upper rim from the wall of the container 1 and is held in position by brackets or spacers 9, shown best in Fig. 3. This allows an annular opening between the upper rim of the baffle and the bottom of the container through which fluid may find access to said chamber from the tank. The lower apex of the baffle 4 is connected to the pipe 3 to form a sealing connection therewith and it will be obvious that slush or sediment gathering in the lower end of the tank and upon the baffle may be drawn off through the pipe 3.

Above the baffle 4 is a deflecting plate 10 which is secured at its upper end to the inner wall of the tank or container 1 as by welding, or otherwise, at 11. This deflecting plate tapers downwardly and is in the form of an inverted frustrum of a cone. The lower end overlaps the upper end of the baffle 4 and is spaced therefrom to allow the passage of fluid around the lower end of the deflecting plate, as indicated in the drawing. It will be seen that this plate functions to direct the sediment or impurities settling out of the water in the tank downwardly into the baffle 4, so that it may be drawn off.

The upper end of the tank or container has a top wall 12, which extends inwardly from the side walls and connects at 13 with an upwardly extending chamber 14 having open connection with the interior of the tank. This extension is closed at its upper end except for a central outlet pipe 15, which allows exhaust of the steam entering the tank. This outlet is restricted in size so that the steam will be under slight pressure within the container due to the restricted size of the opening.

Within the chamber 14 I provide a conical shaped baffle 16, which has its lower end spaced from the cylindrical wall of the chamber and supported upon brackets 17 which, as will be seen, are connected with the wall of the chamber at spaced intervals around the lower end of the cone. The cone is spaced from the wall of the chamber to allow passage upwardly around the lower end thereof of steam, the passage of steam being indicated by the dotted arrows 18.

Below the cone shaped baffle 16 is a second frusto-conical shaped baffle 19. This baffle is also spaced somewhat from the wall of the chamber and supported by brackets 20. Its upper end is within the margin of the cone 16 so that feed water entering the upper chamber 14 through inlet pipe 21 will be deflected downwardly past the upper end of the baffle 19 and will thus flow downwardly over the upper surface of the said baffle into the tank 1. I have shown a support for the upper wall of the container which reenforces the same, said support comprising a cross shape member 22, which is preferably of tubular stock as shown.

The incoming charge of fresh water entering the tank comes by way of a pipe shown at 23 in the drawing. This water first enters a small container 24 in which I contemplate placing chemicals which may be employed in treating the water. Any desirable composition of treating material may be employed and the particular composition thereof forms no part of the present invention. The water entering through the pipe 23 will pass through the container 24 to the pipe 21, which will discharge it downwardly upon the baffles 16 and 19. The chemicals which would be dissolved and diluted by the water 24 will be fed gradually to the tank or container 21 through a valve control passage 25. This passage may be constricted by means of a valve so as to allow the feeding of the chemicals to the tank in the desired quantity.

The steam employed in heating the incoming stock of fresh water is exhaust steam and will be delivered to the tank through the pipe 26, which is positioned at a level closely adjacent the upper end of the tank. Directly opposite the steam pipe 26 is an outlet pipe 27, which is of restricted size. This outlet together with the outlet 15 shown at the upper end of the container furnish exhaust for the steam entering the tank, and as previously stated will be so restricted as to maintain a pressure within the heater.

I have shown provision for a gauge glass indicated in dotted lines at 28. This gauge glass is positioned adjacent the upper water level in the heater.

In the operation of my device the water will be delivered as previously noted over the baffles 16 and 19. The water will pass in a thin film over these baffles and will drip from the upper baffles downwardly on the lower one and from the lower one will drip downwardly into the tank. The path of this water film is shown by the arrows 29.

While the water is thus being delivered into the tank the steam entering through the pipe 26 will exert a draft or current along the upper surface of the water in the container and any oil or other floating impurities coming into the tank may be blown outwardly through the pipe 27. The greater volume of steam will, however, pass upwardly as previously noted around the baffles in such way as to come in close contact with the incoming stream of water in the manner noted. There will hence be a close contact of the steam at the upper end of the container with the inflow of fresh water. This water stream will be in a thin film and in the form of drops so that the steam may better deliver heat thereto on its passage upwardly to the outlet 15.

Impurities in the water in the tank 1 and settled out partly by means of the chemicals fed to the heater will pass downwardly over the deflecting plate 10 and the baffle 4 and may be drawn off through the outlet pipe 3. The size of the container is sufficient so that there will be no strong current of water downwardly to the outlet pipe 7 and sludge and impurities in the water will hence not be carried over the upper rim of the baffle 4 to the chamber 5 and feed water will hence be a hot clear stream of water which may be delivered directly to the boiler.

I desire to calibrate the capacity of the tank and the size of the outlet so that under normal conditions the level of liquid in the tank will be maintained closely adjacent the steam inlet, as will be noted from the drawing.

An advantage of this device lies in the manner in which the steam coming to the container is brought into intimate contact with the thin film of water fed to the tank. Furthermore, the steam is in continual contact with the upper surface of the heated water in the tank 1 and tends to maintain the same in its heated condition and to impart additional heat thereto. It has been found by actual test that the temperature of the water in the tank 1 may be maintained above 200° Fahrenheit due to the manner of treatment above described. The device is therefore simple and economical to construct and efficient in its operation.

What is claimed as new is:

1. In a feed water heater, a tank, means to heat the water therein, a downwardly tapered bottom thereon, a funnel shaped baffle above said bottom, the upper rim of said baffle directly being spaced from the walls of said tank, an outlet for sediment from the lower end of said baffle, a downwardly tapered deflecting plate secured at its outer rim to the inner wall of said tank above said baffle to overlie the upper rim of said baffle, and means to draw off hot water from said tank below said baffle.

2. A feed water heater including a tank, a reduced extension at the upper end thereof, superposed conical baffles in said extension, means to feed water in a film over said baffles to flow said water from one baffle upon the next succeeding lower one, an inlet for steam adjacent the upper end of said tank, a restricted outlet for steam in said extension, an outlet for steam and scum from the water in said tank opposite the said steam inlet, and an outlet for hot water at the lower end of said tank.

3. A feed water heater including a tank, a reduced extension at the upper end thereof, superposed conical shaped baffles in said extension, means to feed water in a film over said baffles, an inlet for steam adjacent the upper end of said tank, a restricted outlet for steam in said extension, means to feed a limited flow of water-treating liquid to said tank, an outlet for steam and scum from the water in said tank opposite the said steam inlet, and an outlet for hot water at the lower end of said tank arranged to maintain the water level adjacent said tank outlet for steam.

4. A feed water heater including a tank, a reduced extension at the upper end thereof, superposed baffles in said extension, a pipe to feed water in a film centrally over said baffles, an inlet for steam adjacent the upper end of said tank, outlets for steam from said tank sufficiently restricted to maintain a slight pressure in said tank, and a hot water outlet from said tank constructed to maintain the liquid level in said tank closely adjacent the said steam inlet.

5. A feed water heater including a tank, an upward extension thereon having a restricted steam outlet, a plurality of downwardly sloping circular baffles in said extension, said baffles increasing successively in external diameter downwardly, means to deliver fresh water downwardly over said baffles, the water falling from one baffle upon the next succeeding lower one, a steam inlet to said tank adjacent the upper end of said tank, and a water outlet adjacent the lower end of said tank constructed to maintain the water level in said tank slightly below said steam inlet.

6. A feed water heater including a tank, an upward extension thereon having a restricted steam outlet, a plurality of downwardly sloping circular baffles in said extension, a pipe to deliver fresh water upon the uppermost baffle to flow downwardly from one baffle directly over each succeeding lower baffle, a steam inlet to said tank adjacent the upper end of said tank, a restricted outlet in the wall of said tank opposite said steam inlet, and a water outlet adjacent the lower end of said tank regulated to maintain the water level in said tank slightly below said steam inlet.

SIDNEY Q. BATES.